US011517075B2

(12) United States Patent
Tanabe et al.

(10) Patent No.: US 11,517,075 B2
(45) Date of Patent: Dec. 6, 2022

(54) SHOE SOLE MEMBER, SHOE, AND METHOD FOR MANUFACTURING SHOE SOLE MEMBER

(71) Applicant: ASICS CORPORATION, Hyogo (JP)

(72) Inventors: Tatsuro Tanabe, Hyogo (JP); Junichiro Tateishi, Hyogo (JP)

(73) Assignee: ASICS CORPORATION, Hyogo (JP)

( * ) Notice: Subject to any disclaimer, the term of this patent is extended or adjusted under 35 U.S.C. 154(b) by 0 days.

(21) Appl. No.: 17/294,786

(22) PCT Filed: Nov. 19, 2018

(86) PCT No.: PCT/JP2018/042658
§ 371 (c)(1),
(2) Date: May 18, 2021

(87) PCT Pub. No.: WO2020/105089
PCT Pub. Date: May 28, 2020

(65) Prior Publication Data
US 2021/0401117 A1  Dec. 30, 2021

(51) Int. Cl.
| | |
|---|---|
| *A43B 13/04* | (2006.01) |
| *A43B 13/18* | (2006.01) |
| *B29D 35/00* | (2010.01) |
| *B29D 35/02* | (2010.01) |
| *B29D 35/12* | (2010.01) |
| *B29K 105/04* | (2006.01) |

(52) U.S. Cl.
CPC ............ *A43B 13/187* (2013.01); *A43B 13/04* (2013.01); *B29D 35/0009* (2013.01); *B29D 35/02* (2013.01); *B29D 35/122* (2013.01); *B29K 2105/04* (2013.01)

(58) Field of Classification Search
CPC ... A43B 13/187; A43D 35/00; B29D 35/0009
USPC ....................................................... 36/25 R
See application file for complete search history.

(56) References Cited

U.S. PATENT DOCUMENTS

| | | | |
|---|---|---|---|
| 2009/0113758 A1* | 5/2009 | Nishiwaki | A43B 13/10 36/28 |
| 2009/0247656 A1 | 10/2009 | Jacob et al. | |
| 2010/0031535 A1* | 2/2010 | Leedy | B29D 35/142 36/103 |

(Continued)

FOREIGN PATENT DOCUMENTS

| | | |
|---|---|---|
| CN | 1323855 A | 11/2001 |
| EP | 3056105 A1 | 8/2016 |

(Continued)

OTHER PUBLICATIONS

Chinese Office Action and Search Report dated Sep. 2, 2021 in corresponding Chinese Patent Application No. 201880098893.4 (with English Translation).

(Continued)

*Primary Examiner* — Timothy K Trieu
(74) *Attorney, Agent, or Firm* — Global IP Counselors, LLP (57) ABSTRACT

A shoe sole member formed by a foam includes cells having a certain size and being excellent in transparency in order to provide a shoe sole member being lightweight and excellent cushioning properties while having transparency.

4 Claims, 5 Drawing Sheets

(56) References Cited

U.S. PATENT DOCUMENTS

| | | | |
|---|---|---|---|
| 2010/0050475 A1* | 3/2010 | Benz | A43B 5/06 |
| | | | 36/103 |
| 2012/0227289 A1* | 9/2012 | Beers | A43B 3/246 |
| | | | 36/25 R |
| 2014/0115925 A1 | 5/2014 | Hurd et al. | |
| 2015/0143723 A1 | 5/2015 | Tateishi et al. | |
| 2017/0105480 A1 | 4/2017 | Hurd et al. | |
| 2017/0253709 A1 | 9/2017 | Kurita et al. | |
| 2018/0368515 A1 | 12/2018 | Yamade et al. | |
| 2020/0046067 A1 | 2/2020 | Yamade | |

FOREIGN PATENT DOCUMENTS

| | | |
|---|---|---|
| EP | 3384797 A1 | 10/2018 |
| JP | 2003-292667 A | 10/2003 |
| JP | 2009-056007 A | 3/2009 |
| JP | 2017-171846 A | 9/2017 |
| WO | 2013/179455 A1 | 12/2013 |
| WO | 2016/039310 A1 | 3/2016 |
| WO | 2017/051473 A1 | 3/2017 |
| WO | 2018/142467 A1 | 8/2018 |

OTHER PUBLICATIONS

Extended European Search Report dated Oct. 12, 2021 in corresponding European Patent Application No. 18940609.3.

International Preliminary Report on Patentability dated May 25, 2021 in corresponding International Patent Application No. PCT/JP2018/042658, filed Nov. 19, 2018 (with English Translation).

International Search Report dated Feb. 5, 2019 in corresponding International Patent Application No. PCT/JP2018/042658, filed Nov. 19, 2018 (with English Translation).

Chinese Office Action dated Jan. 19, 2022 in corresponding Chinese Application No. 201880098893.4.

* cited by examiner

SHOE SOLE MEMBER, SHOE, AND METHOD FOR MANUFACTURING SHOE SOLE MEMBER

CROSS-REFERENCE TO RELATED APPLICATIONS

This application is a U.S. National Stage application of International Application No. PCT/JP2018/042658, filed Nov. 19, 2018, the contents of which are hereby incorporated herein by reference.

BACKGROUND

Field of Invention

The present invention relates to a shoe sole member, a method for producing the shoe sole member, and a shoe including such a shoe sole member.

Background Information

Shoes used in various competitions generally includes an upper portion and a shoe sole. Shoes as aforementioned are constituted by many members, for example, constituted by using shoe sole members such as an inner sole, a sock liner, a midsole, an outsole, or the like. Among them, there is conventionally strong demand for the midsole being excellent in lightweight properties and cushioning performance, and thus the midsole is conventionally constituted by a resin foam. In a conventional shoe, a shoe sole member called a cushioning part is arranged at a specific position of a shoe sole to allow the specific position to exhibit cushioning performance different from the midsole (see JP 2009-056007 A).

SUMMARY

A cushioning part of a shoe sole is generally required to have elastic deformability and recovery properties from the deformation, and therefore sometimes constituted by a soft polymer composition called, for example, "gel". The hardness of the polymer composition of this type is generally adjusted by the content of a plasticizer such as an oil for use as a material to form a shoe. In recent years, a shoe with a special shoe sole member such as a cushioning part arranged at a position visible from outside the shoe, which enables instant recognition of the excellent function through such an appearance, is commercially available. The polymer composition as aforementioned is effective to have transparency and improve the appearance of the shoe.

Meanwhile, in the shoe sole member of this type, the density is hardly adjusted by the ratio of the plasticizer, while the cushioning properties can be easily adjusted by the ratio of the plasticizer as described above. That is, the conventional shoe sole member is unlikely to be sufficiently effective for reducing the weight of the shoe.

In the shoe sole member constituted by the polymer composition of this type, the polymer composition is brought into a foamed state to thereby enable reduction of its weight while adjustment of the cushioning properties. In this case, however, the shoe sole member hardly has transparency even if it is constituted by a transparent polymer composition. Therefore, it has been conventionally difficult to obtain a shoe sole member that is lightweight and has excellent cushioning properties while having transparency, and it has been conventionally difficult to obtain a shoe that feels excellent while being worn and also has an excellent aesthetic appearance. Thus, an object of the present invention is to solve such a problem. That is, it is an object of embodiments of the present invention to provide a shoe sole member that is lightweight and has excellent cushioning properties while having transparency, and to provide a shoe that feels excellent while being worn and has an excellent aesthetic appearance.

In order to solve the aforementioned problem, embodiments of the present invention provide a shoe sole member constituted by a foam, wherein the foam has transparency, an elastic modulus of 0.02 MPa or more and 1.4 MPa or less, an expansion ratio of more than 1 time and 3 times or less, and an average cell diameter (D50) of 0.8 mm or more and 20 mm or less.

In order to solve the aforementioned problem, embodiments of the present invention provide a shoe as described above.

In order to solve the aforementioned problem, embodiments of the present invention provide a method for producing a shoe sole member constituted by a foam, including:

an injection step of injecting a polymer composition including a foaming agent in a heated and molten state into a cavity of a forming mold; and a core-back step of expanding a volume of the cavity with the injected polymer composition placed therein, the core-back step including foaming the polymer composition to produce a foam by which the shoe sole member is constituted, and in the core-back step, producing a foam, as the foam, having transparency, an elastic modulus of 0.02 MPa or more and 1.4 MPa or less, an expansion ratio of more than 1 time and 3 times or less, and an average cell diameter (D50) of 0.8 mm or more and 20 mm or less.

BRIEF DESCRIPTION OF DRAWINGS

The invention will be explained in more detail hereinafter with reference to the drawings.

DETAILED DESCRIPTION

Figure 1:
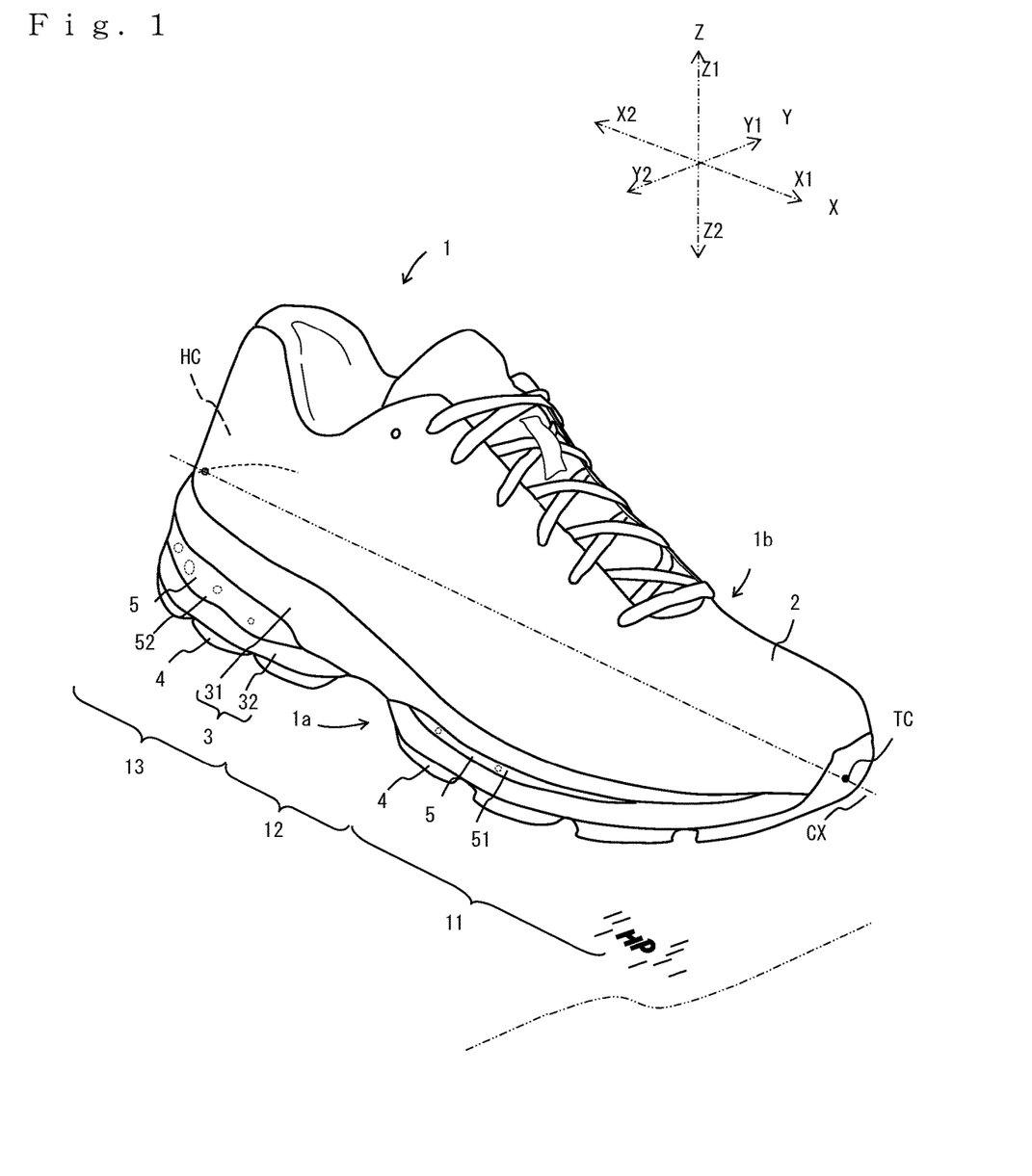
FIG. 1 is a schematic perspective view showing a shoe including a shoe sole member.

A shoe sole member according to embodiments of the present invention will be hereinafter described by way of embodiments. Hereinafter, the description will be given for an embodiment by taking, for example, the case where the shoe sole member of the present invention is arranged in a midsole of a shoe. FIG. 1 shows a shoe formed using the shoe sole member of this embodiment. The shoe 1 includes an upper portion 2 and a shoe sole. The shoe sole is constituted by a plurality of shoe sole members. The shoe includes a midsole 3 and an outsole 4 as the shoe sole member. Hereinafter, when a description is given on the shoe shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Among directions orthogonal to the shoe center axis CX, a direction parallel to a horizontal plane HP may be referred to as a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

Figure 2:
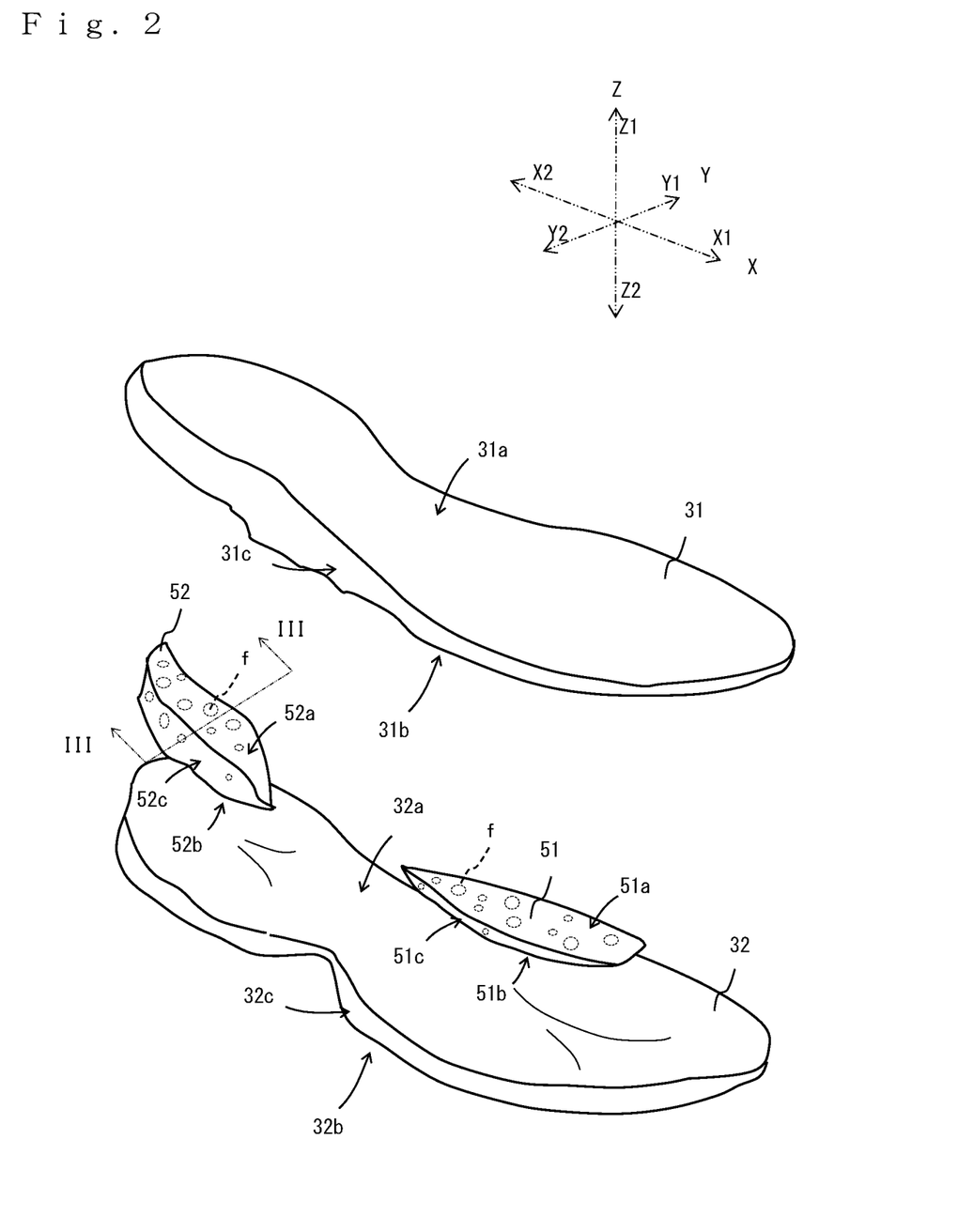
FIG. 2 is an exploded view of a shoe sole of the shoe shown in FIG. 1.

As shown in FIG. 1, the shoe 1 of this embodiment includes the outsole 4 in its bottommost position. The outsole 4 of this embodiment has, for example, a sheet shape, and is arranged in the bottommost position of the shoe 1 so that the thickness direction thereof corresponds to the vertical direction Z. The shoe 1 includes the midsole 3 between the outsole 4 and the upper portion 2 that covers a foot of a wearer from the upper side. As shown in FIG. 2, the midsole 3 of this embodiment is separated into two upper and lower layers. Specifically, the shoe 1 of this embodiment includes a first midsole 31 that constitutes the upper layer of the two layers, and a second midsole 32 that constitutes the lower layer of the two layers. The outline shape of the first midsole 31 as viewed in the vertical direction corresponds to the outline shape of the second midsole 32, and they are vertically layered to have outer peripheral edges conforming to each other. The first midsole 31 has an upper surface 31a that is in contact with the upper portion 2 from below, and a lower surface 31b that is in contact with an upper surface of the second midsole 32. The second midsole 32 has a lower surface 32b that is in contact with the outsole 4 from above. The shoe 1 of this embodiment includes two cushioning members 5 as a shoe sole member sandwiched between the first midsole 31 and the second midsole 32. The size of each of the cushioning parts 5 as viewed in the vertical direction is smaller than the first midsole 31 and the second midsole 32. Accordingly, certain parts of the lower surface 31 of the first midsole 31 are bonded to the cushioning parts 5 and the remaining part of the lower surface 31 is bonded to the upper surface 32a of the second midsole 32.

One of the two cushioning members 5 (hereinafter also referred to as "first cushioning member 51") is sandwiched between the first midsole 31 and the second midsole 32 in a forefoot portion 11 of the shoe. The other one of the two cushioning members 5 (hereinafter also referred to as "second cushioning member 52") is sandwiched between the first midsole 31 and the second midsole 32 in a rear foot portion 13 of the shoe.

Each of the first cushioning member 51 and the second cushioning member 52 is arranged on the shoe sole to be partly exposed to the outside, and arranged to constitute a part of an outer peripheral surface of the shoe sole. The first cushioning member 51 has a side surface 51c constituting the outer peripheral surface, an upper surface 51a spreading inward from an upper edge of the side surface 51c, and a lower surface 51b spreading inward from a lower edge of the side surface 51c. That is, the first cushioning member 51 has the upper surface 51a that is in contact with the lower surface 31b of the first midsole 31 from below, and the lower surface 51b that is in contact with the upper surface 32a of the second midsole 32 from above. In the same manner as the first cushioning member 51, the second cushioning member 52 has a side surface 52c constituting the outer peripheral surface, an upper surface 52a spreading inward from an upper edge of the side surface 52c, and a lower surface 52b spreading inward from a lower edge of the side surface 52c. That is, the second cushioning member 52 has the upper surface 52a that is in contact with the lower surface 31b of the first midsole 31 from below, and the lower surface 52b that is in contact with the upper surface 32a of the second midsole 32 from above.

Figure 3:
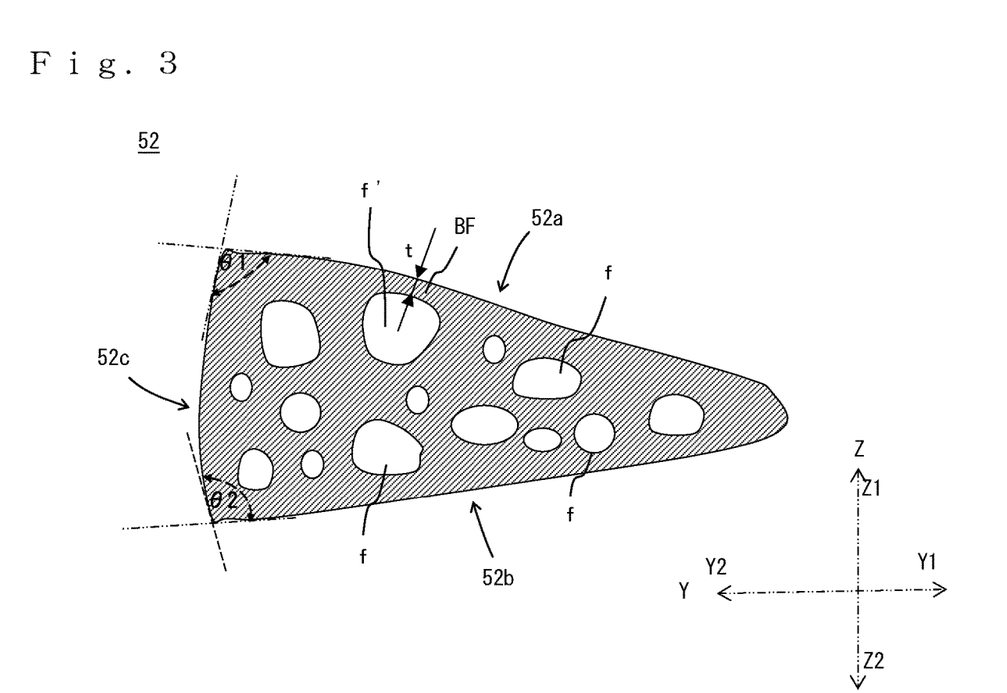
FIG. 3 is a cross sectional view of a cushioning member (second cushioning member 52) taken along the line and viewed in the direction of arrows in FIG. 2.

As shown in FIG. 2 and FIG. 3, each of the first cushioning member 51 and the second cushioning member 52 has such a shape as to increase the thickness as it advances in the direction Y2 from the medial side to the lateral side. In other words, each of the first cushioning member 51 and the second cushioning member 52 has such a shape as to increase the thickness as it advances from the center toward the outer peripheral surface of the shoe sole, while decreasing the thickness as it advances from a lateral side surface 1a of the shoe 1 toward the center of the shoe 1. Each of the first cushioning member 51 and the second cushioning member 52 of this embodiment is configured not to cross the shoe 1 in the width direction and not to be observed from a medial side surface 1b of the shoe 1.

Each of the first cushioning member 51 and the second cushioning member 52 of this embodiment is a foam entraining a plurality of cells f as shown in FIG. 3. The first cushioning member 51 and the second cushioning member 52 of this embodiment are, for example, foams constituted by the same polymer composition.

The foam has transparency. In the description herein, "transparency" means that, for example, a total light transmittance when a thickness is 4 mm is 40% or more. The aforementioned total light transmittance of the foam is preferably 50% or more. An average cell diameter (D50) of the foam is preferably 0.8 mm or more and 20 mm or less. In the description herein, the foam defined by the expression "the foam has transparency" is intended not only to the colorless and transparent foam, but also to a colored transparent foam. These foams can have cut surfaces of cells appearing on the surface or a skin layer provided on the surface by cell films of outermost cells. When the skin layer is provided, there is an advantage that a strength (such as scratch resistance) under the use environment is expected to be increased. In the embodiments where the foam is, for example, produced by being cut out of a larger foam to have a certain shape with no skin layer on the surface, a skin layer can be formed by bonding a separate member (e.g., a resin film) to the surface. Also in these embodiments, the advantageous effect on, for example, scratch resistance as aforementioned can be expected.

It is possible to see deep inside the first cushioning member 51 when it is in the form of foam because the polyester composition included as a constituent has transparency and cells inside thereof are relatively large. That is, the first cushioning member 51 in the shoe 1 of this embodiment is arranged to make it possible to see the inside of the first cushioning part 51 from the lateral side toward the medial side through the side surface 51c, thereby enabling a sense of depth to be perceived. Further, the first cushioning member 51 is arranged so as to enable visual observation of the state of the lower surface 31b of the first midsole 31 and the state of the upper surface 32a of the second midsole 32 through the side surface 51c, when it is sandwiched between the first midsole 31 and the second midsole 32. The same applies to the second cushioning member 52 in terms of the aforementioned characteristics.

As seen from the above, according to the shoe 1 of this embodiment, in the case where the lower surface 31b of the first midsole 31 is imparted with a color tone or pattern different from those of the side surface 31c, or the upper surface 32a of the first midsole 31 is imparted with a color tone or pattern different from those of the side surface 32c, those color tones or patterns are allowed to be visible from the outside through the first cushioning member 51 and the second cushioning member 52. In order to cause the first cushioning member 51 and the second cushioning member 52 to significantly exert an effect of enabling the visual observation of the design at a hidden place of the midsole, while causing them to have a reduced weight by being foamed, it is preferable that the first cushioning member 51 and the second cushioning member 52 each have a first surface that serves as a part of an outer peripheral surface of the shoe sole, a second surface that is in contact with the upper surface or the lower surface of the midsole, and a corner having an angle of 30° or more and 120° or less and more preferably form a corner having an angle of 45° or more and 90° or less between the first surface and the second surface. A description will be given for this configuration with reference to FIG. 3 that shows the cross section of the second cushioning member 52 cut by the vertical plane at the central portion in the length direction of the second cushioning member 52. Angle θ1 or θ2 of the corner formed by the side surface 52c corresponding to the first surface and the upper surface 52a or the lower surface 52b corresponding to the second surface in the cross section is set to the aforementioned angle to facilitate the visual observation of the second cushioning member 52 and thus produce an advantageous effect of improving the aesthetic appearance of the shoe. The same effect can be also exerted on the first cushioning member 51.

The transparency of the foam can be measured by, for example, a method according to JIS K7361-1. More specifically, the total light transmittance is measured for a test piece having a thickness of 4 mm produced by removing a skin layer from the foam, using an instrument such as a turbidimeter (for example, product name "NDH2000" manufactured by Nippon Denshoku Industries Co., Ltd.). When the measured total light transmittance is 40% or more, the foam can be confirmed to be transparent.

The total light transmittance of the foam (with a thickness of 4 mm) is preferably 40% or more, more preferably 50% or more.

In collecting a test piece of 4 mm from the foam, it is desirable to pay attention so as not to form a through hole passing through the test piece by a coarse cell, and if a through hole is formed, it is desirable to measure the total light transmittance at a portion excluding the through hole. In the case where the total light transmittance greatly varies depending on the measured positions, it can be obtained as an arithmetic average value of measured values of plural positions (for example, 10 positions) chosen at random.

In the case where it is difficult to measure the test piece while avoiding a through hole due to many through holes formed in the test piece, the measurement can be performed by increasing the thickness of the test piece to convert the measurement result into the value in the thickness of 4 mm. Same applies to the case where a foam is too thin to collect a test piece of 4 mm. For example, the calculation based on the following formula can be employed for converting the total light transmittance (Ix) determined for the test piece, which has a thickness other than 4 mm (X: mm), into the total light transmittance (I4) for the test piece of 4 mm.

$$I4=(Ix)^{4/X}$$

In the case where a foam is small and therefore only a test piece smaller than the measurable range of the turbidimeter is obtainable, a plurality of test pieces can be prepared and aligned to each other so as not to cause any gaps therebetween to be served as an object to be measured in the measurement of the total light transmittance.

In order to cause the foam to have the translucency as aforementioned, the total light transmittance of a polymer composition for forming the foam is preferably 50% or more, more preferably 70% or more when the polymer composition has a thickness of 4 mm in a non-foamed state.

The elastic modulus of the foam is preferably 0.02 MPa or more, more preferably 0.1 MPa or more. The elastic modulus of the foam is preferably 1.4 MPa or less, more preferably 1.3 MPa or less. That is, the aforementioned elastic modulus is preferably in a range of 0.02 MPa to 1.4 MPa, more preferably 0.1 MPa to 1.3 MPa.

The elastic modulus of the foam can be measured by, for example, a method described in JIS K7161 and measured by determining the inclination of "stress/strain curve" between the strains at two points ($\varepsilon 1=0.05\%$, $\varepsilon 2=0.25\%$) by an apparatus such as "5960 Series Dual Column Table Frames", a product name of INSTRON.

In order to cause the foam to have the elastic modulus as aforementioned, the elastic modulus of the polymer composition constituting the foam is preferably 0.02 MPa or more, more preferably 0.4 MPa or more, when the polymer composition is in a non-foamed state. The aforementioned elastic modulus of the polymer composition is preferably 10 MPa or less, more preferably 5 MPa or less.

The polymer included in the polymer composition constituting the foam can be, for example, an olefin-based polymer such as an olefin-based elastomer or an olefin-based resin. Examples of the olefin-based polymer include polyolefins of polyethylene (for example, linear low-density polyethylene (LLDPE) and high density polyethylene (HDPE)) and polypropylene, and polyolefins of ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylate copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylate copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer (EVA), and propylene-vinyl acetate copolymer.

The polymer can be, for example, an amide-based polymer such as an amide-based elastomer or an amide-based resin. Examples of the amide-based polymer include polyamide 6, polyamide 11, polyamide 12, polyamide 66, and polyamide 610. The polymer can be, for example, an ester-based polymer such as an ester-based elastomer or an ester-based resin. Examples of the ester-based polymer include polyethylene terephthalate and polybutylene terephthalate. The polymer can be, for example, a urethane-based polymer such as a urethane-based elastomer or a urethane-based resin. Examples of the urethane-based polymer include polyester-based polyurethane and polyether-based polyurethane.

The polymer can be, for example, a styrene-based polymer such as a styrene-based elastomer or a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene (SBSB), and styrene-butadiene-styrene-butadiene-styrene (SBSBS). Examples of the styrene-based resin include polystyrene, acrylonitrile styrene resin (AS resin), and acrylonitrile butadiene styrene resin (ABS resin).

Examples of the polymer for use can include an acrylic polymer such as polymethyl methacrylate; a polyvinyl chloride-based resin; a silicone-based elastomer; butadiene rubber (BR); isoprene rubber (IR); chloroprene rubber (CR); natural rubber (NR); styrene butadiene rubber (SBR); acrylonitrile butadiene rubber (NBR); and butyl rubber (IIR).

The polymer composition can include solely a single polymer such as one aforementioned, or can include a plurality of polymers as aforementioned.

The polymer composition can further include a plasticizer that has a plasticization effect on the polymer. The polymer composition including the plasticizer makes it possible to easily adjust the elastic modulus or the hardness. The polymer composition including the plasticizer makes it possible to prevent transparency from being deteriorated due to the crystallization of the polymer.

Examples of the plasticizer include: epoxidized oils such as epoxidized soy oil or epoxidized flaxseed oil; hydrocarbons such as liquid paraffin, paraffin wax, naphthene oil, polybutadiene, or polybutene; esters such as carboxylic acid ester, phosphoric acid ester, or sulfonic acid ester; and higher alcohols such as oleyl alcohol or stearyl alcohol. Examples of the carboxylic acid ester include: aromatic esters such as phthalic acid esters, isophthalic acid esters, or maleic acid esters; and aliphatic esters such as adipic acid esters, sebacic acid esters, dodecanedioic acid esters, fumaric acid esters, trimellitic acid esters, citric acid esters, itaconic acid esters, oleic acid esters, stearic acid esters, or ricinoleic acid esters.

As the polymer included in the polymer composition, a polymer having a high affinity with the plasticizer as aforementioned is preferable. From this viewpoint, the polymer composition preferably includes one or more selected from the group consisting of an olefin-based elastomer, a urethane-based polymer, and a styrene-based thermoplastic elastomer. It is preferable that the polymer composition include any one of an olefin-based elastomer, a urethane-based polymer, and a styrene-based thermoplastic elastomer in the highest amount (at a highest mass ratio) among all the polymers contained in the polymer composition.

The polymer composition can include a crosslinking agent for crosslinking the polymer as needed. As the crosslinking agent, for example, organic peroxides, maleimide crosslinking agents, sulfur, phenolic crosslinking agents, oximes, polyamines, or the like can be employed. Further, the polymer can be crosslinked by irradiation of electron beam or X-ray.

Examples of the organic peroxide include dicumyl peroxide, di-t-butyl peroxide, 2,5-dimethyl-2,5-di-(t-butylperoxy)hexane, 2,5-dimethyl-2,5-di-(t-butylperoxy)hexane-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butyl peroxybenzoate, t-butylperoxyisopropyl carbonate, diacetyl peroxide, lauroyl peroxide, and t-butylcumyl peroxide. The polymer composition can include solely a single crosslinking agent such as one described above, or can include a plurality of crosslinking agents.

In the polymer composition, an inorganic filler such as clay, talc, or silica can be further included. The inorganic filler included in the polymer composition can be metal foil, glass flakes, pearl mica, or the like having light reflection properties. The polymer composition can include solely a single inorganic filler such as one described above, or can include a plurality of inorganic fillers. The polymer composition can include an organic filler such as cellulose nanofibers and aramid fibers.

A foaming agent for causing the polymer composition to be foamed is not particularly limited and can be an organic or inorganic chemical foaming agent or a physical foaming agent. As the foaming agent, one or two or more selected from, for example: azodicarbonamide (ADCA), 1,1'-azobis (1-acetoxy-1-phenylethane), dimethyl-2,2'-azobisbutyrate, dimethyl-2,2'-azobisisobutyrate, 2,2'-azobis (2,4,4-trimethylpentane), 1,1'-azobis (cyclohexane-1-carbonitrile), or 2,2'-azobis [N-(2-carboxyethyl)-2-methyl-propionamidine]; nitroso compounds such as N,N'-dinitrosopentamethylenetetramine (DPT); hydrazine derivatives such as 4,4'-oxybis (benzenesulfonylhydrazide), or diphenylsulfone-3,3'-disulfonylhydrazide; semicarbazide compounds such as p-toluenesulfonyl semicarbazide; and thermally decomposable organic foaming agents such as trihydrazino triazine can be employed.

As the foaming agent, one or two or more selected from thermally decomposable inorganic foaming agents, for example: bicarbonates such as sodium hydrogen carbonate or ammonium hydrogen carbonate; carbonates such as sodium carbonate or ammonium carbonate; and nitrites such as ammonium nitrite or hydrogen compounds thereof, can be employed.

As the foaming agent, organic foaming agents such as various aliphatic hydrocarbons such as methanol, ethanol, propane, butane, pentane, or hexane, and inorganic foaming agents such as air, carbon dioxide, nitrogen, argon, or water can be used. The inorganic foaming agent can be used under the conditions in which it becomes a supercritical fluid.

The polymer composition can include one or two or more selected from among, for example, a processing aid, a weather-proof agent, a flame retardant, a pigment, a mold releasing agent, an electrostatic preventing agent, an antimicrobial agent, and a deodorizer.

Even the polymer composition is excellent in transparency, the foam composed of the polymer composition as aforementioned does not have transparency when a large amount of fine cells is included. Thus, it is preferable that the expansion ratio of the foam constituting the first cushioning member 51 and the second cushioning member 52 be more than 1 time or more and 3 times or less. In order to cause the first cushioning member 51 and the second cushioning member 52 to have excellent lightweight properties, the expansion ratio of the foam is preferably 1.2 times or more, more preferably 1.3 times or more.

The expansion ratio of the foam can be obtained by measuring an apparent density of the foam and a density of the polymer composition. The apparent density can be measured based on, for example, a method described in JIS K7222:2005 "Cellular plastics and rubbers-Determination of apparent (bulk) density". The density of the polymer composition can be determined by preparing a non-foamed sample composed of the polymer composition. The density of the sample can be measured by the A method (the underwater substitution method) according to JIS K7112:1999 "Plastics-Determination of density and specific gravity of non-foamed plastics". The expansion ratio can be determined by the following formula.

Expansion ratio=density of polymer composition/ apparent density of foam

In order to cause the foam used as the first cushioning member 51 and the second cushioning member 52 to have excellent transparency, the average cell diameter (D50) of the foam is preferably 0.5 mm or more. The average cell diameter (D50) is more preferably 0.8 mm or more, still more preferably 1.0 mm or more, particularly preferably 1.2 mm or more. When the average cell diameter (D50) is excessive, it becomes difficult for the first cushioning member 51 or the second cushioning member 52 to have a desired strength. Thus, the aforementioned average cell diameter (D50) is preferably 20 mm or less, more preferably 15 mm or less, still more preferably 10 mm or less, particularly preferably 5 mm or less.

A 10% cell diameter (D10) of the foam is preferably 0.2 mm or more, more preferably 0.3 mm or more, still more preferably 0.4 mm or more, particularly preferably 0.5 mm or more. A 90% cell diameter (D90) of the foam is preferably 5.0 mm or less, more preferably 4.0 mm or less, still more preferably 3.5 mm or less, particularly preferably 3.0 mm or less.

The cell diameter in this embodiment means, as described later, a diameter of a circumcircle of a cell. Accordingly, the foam does not need to have a size capable of containing a spherical cell having a diameter of 0.8 mm even when the average cell diameter (D50) is 0.8 mm. That is, when the direction in which the foam has a maximum dimension on a plane orthogonal to the thickness direction of the foam is referred to as "length" and the direction orthogonal to the aforementioned direction in which the foam has a maximum dimension on the plane is referred to as "width", the foam of this embodiment can contain a cell having a diameter of 0.8 mm as long as any one of the length, the width, and the thickness of the foam exceeds 0.8 mm. Similarly, the foam of this embodiment can contain a cell having a diameter of 20 mm as long as any one of the length, the width, and the thickness of the foam exceeds 20 mm. However, in order to enable the foam of this embodiment to have a preferable cell diameter as mentioned above (D10, D50, D90), the foam of this embodiment preferably has two dimensions among three dimensions, that is, the length, the width, and the thickness exceeding the aforementioned average cell diameter (D50) or a value of a 90% cell diameter (D90), and preferably all the three dimensions exceeding the values of the cell diameters (D50, D90). As described later, the foam of this embodiment preferably has a cell film formed to have a certain thickness (t) or more between the surface of the foam and a cell closest to the surface of the foam. Therefore, each of the dimensions of the length, the width, and the thickness preferably exceeds the value (D50+2t) resulting from adding the thickness (t) of the cell film multiplied by two times (2t) to the value of the average cell diameter (D50), more preferably exceeds the value (D90+2t) resulting from adding the thickness (t) of the cell film multiplied by two times (2t) to the value of the 90% cell diameter (D90).

The 10% cell diameter (D10), the average cell diameter (D50), and the 90% cell diameter can be determined as below. First, the foam is cut so as to have a cross section in parallel to the thickness direction, and an image of the cross section is captured. The image is observed to determine a diameter of a circumcircle of the cross sectional shape of each of the cells cut at the cross section. Assuming that each of the cells is a sphere having a diameter as aforementioned, a cumulative value of the volumes of all the spheres is calculated. Then, a cumulative distribution curve on a volume basis with the horizontal axis as a diameter and the vertical axis as a percentage of volume is prepared, and the diameters at the times when the cumulative value becomes 10%, 50%, and 90% are represented by D10, D50, and D90, respectively. More specifically, D10, D50, and D90 can be determined by performing analysis using an image analysis software "imagej" (product name) (https://imagej.nih.gov/ij/) on an image of a foam cross-section obtained using a digital microscope (for example, model name "VHX-9000" manufactured by Keyence).

The first cushioning member 51 and the second cushioning member 52 can be prepared by producing a foam larger than each of the first cushioning member 51 and the second cushioning member 52 beforehand, followed by cutting the foam into pieces respectively having predetermined shapes. However, this forming manner causes a surface of each of the members to be partly formed by cut surfaces of the cells. Comparing the foam having cells opening on the surface with the foam having no cells opening on the surface, the latter is generally excellent in strength. Also, the latter is advantageous in consideration of the adhesiveness to the midsole since the portions through which the cells are open are not usable for bonding to the first midsole 31 or the second midsole 32. Therefore, it is preferable that the first cushioning member 51 and the second cushioning member 52 have no cells opening on their surfaces. The minimum thickness (t) of a cell film BF formed by the polymer composition between the surface of the foam and a cell closest to the surface of the foam (for example, a cell f' in FIG. 3) is preferably 50 μm or more, more preferably 100 μm or more, still more preferably 150 μm or more, particularly preferably 200 μm or more. The minimum thickness (t) of the cell film is generally 2.5 mm or less, and is preferably 1.5 mm or less.

The first cushioning member 51 and the second cushioning member 52 in a desirable form as aforementioned can be produced using forming molds respectively having cavities corresponding to the whole shapes of these cushioning members. A method for forming a foam serving as the first cushioning member 51 or the second cushioning member 52 using the polymer composition is not particularly limited, but it is preferable to adopt an injection molding method in terms of ease of forming the cell film BF with a desirable configuration and ease of adjusting the size of cells f. In particular, it is preferable to adopt a core-back injection molding in which the polymer composition in a heated and molten state is injected into the cavity of the forming mold, followed by expanding the volume of the cavity, thereby foaming the polymer composition.

That is, a method for producing a shoe sole member of this embodiment is preferably a method for producing a shoe sole member constituted by a foam, including: an injection step of injecting a polymer composition including a foaming agent in a heated and molten state into a cavity of a forming mold; and a core-back step of expanding a volume of the cavity with the injected polymer composition placed therein, the core-back step including foaming the polymer composition to produce a foam by which the shoe sole member is constituted, and in the core-back step, producing a foam, as the foam, having transparency, an elastic modulus of 0.02 MPa or more and 1.4 MPa or less, an expansion ratio of more than 1 time and 3 times or less, and an average cell diameter (D50) of 0.8 mm or more and 20 mm or less.

Figure 4A:
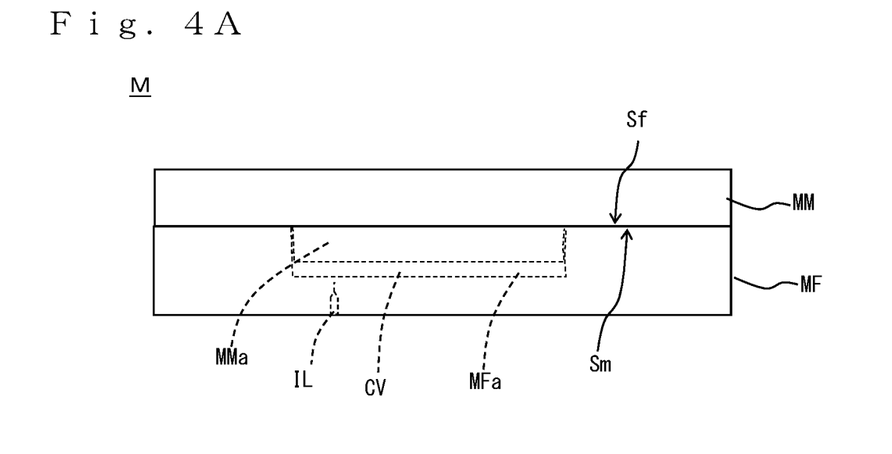
FIG. 4A is a schematic front view of a forming mold for producing a shoe sole member of an embodiment.
Figure 4B:
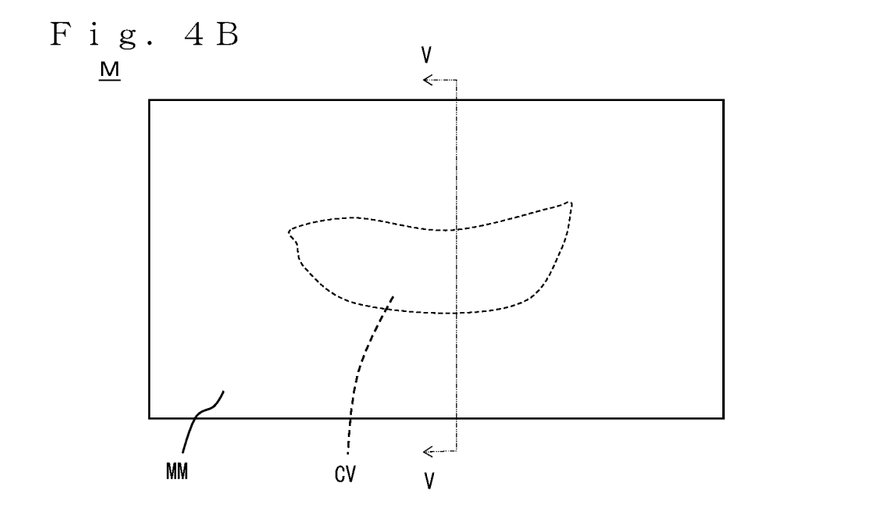
FIG. 4B is a schematic plan view of a forming mold for producing a shoe sole member of an embodiment.
Figure 4C:
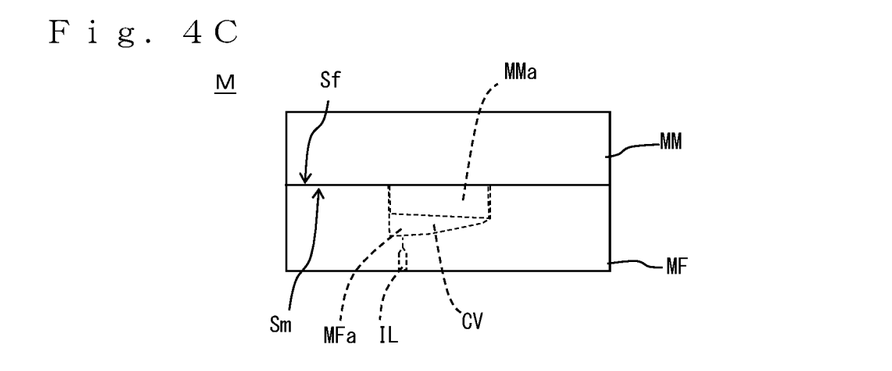
FIG. 4C is a schematic side view of a forming mold for producing a shoe sole member of an embodiment.

In order to produce the foam by a core-back injection molding, a forming mold M as shown in, for example, FIG. 4A, FIG. 4B, and FIG. 4C is used. The forming mold M shown in these Figures is a forming mold for use in producing the second cushioning member 52. The forming mold M is composed of a pair of molds respectively having mating surfaces Sf, Sm that contact each other when the mold is closed. The forming mold M has a male mold MM and a female mold MF as the pair of molds. The forming mold M is configured to be able to form a closed cavity CV inside the forming mold by mating the male mold MM with the female mold MF. The forming mold M is configured to be able to form a closed cavity CV inside the forming mold by mating the male mold MM with the female mold MF. The forming mold M includes an inlet IL for introducing a polymer composition from an injection molding machine, in which the polymer composition is molten and kneaded, to the cavity CV.

Figure 5:
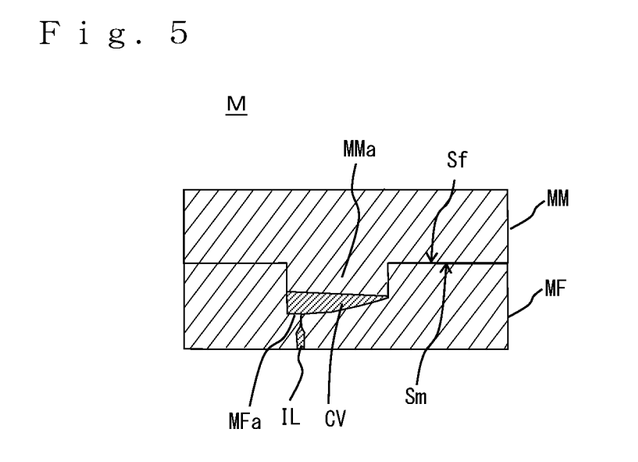
FIG. 5 is a schematic view showing a method for molding a shoe sole member using the forming mold shown in each of FIG. 4A to FIG. 4C.
Figure 6:
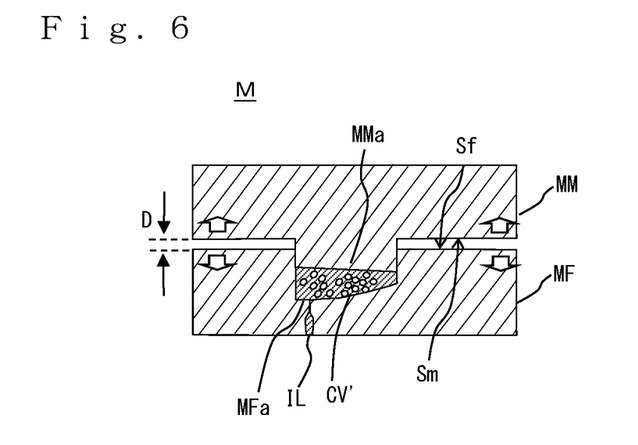
FIG. 6 is a schematic view showing a method for molding a shoe sole member using the forming mold shown in each of FIG. 4A to FIG. 4C.

The forming mold M is configured to be able to form the cavity CV having the same shape as that of the foam in a plan view and having a shape thinner than that of the foam in side view inside the forming mold M when the mold is closed. As shown in FIG. 5 and FIG. 6, the forming mold M is configured such that, while the mating surface Sm of the male mold MM and the mating surface Sf of the female mold MF are positioned to have a gap therebetween, a cavity CV' is formed inside the forming mold M to have a shape corresponding to the foam. That is, in this embodiment, the forming mold M used herein is configured to be switchable between a first state in which the cavity CV having a smaller volume than that of the foam to be produced is formed inside the forming mold, and a second state in which the cavity CV' having a larger volume than that of the first state is formed inside the forming mold.

The female mold MF is opened on the side having the mating surface Sf and includes a molding recess MFa recessed in the thickness direction of the male mold MF. The molding recess MFa is formed to have a depth direction corresponding to the thickness direction of the foam. The male mold MM includes a molding projection MMa that projects from the mating surface Sm and can be thrust into the molding recess MFa of the female mold MF.

In order to produce the foam constituting the second cushioning member 52 by the core-back injection molding, a polymer composition in a heated and molten state is injected into the cavity CV of the forming mold M in the first state (FIG. 5) (injection step), and then the forming mold M is brought into the second state (FIG. 6) (core-back step). At this time, a given distance D is disposed between the female mold MF and the male mold MM. Then, the other cavity CV' having a volume larger than that of the cavity CV in the first state is formed to allow the polymer composition to be placed under reduced pressure, and thereby expanded and filled in the other cavity CV' to produce a foam constituting the second cushioning member 52.

In the above process, the polymer composition injected into the cavity CV is cooled by the surface of a leading end of the molding recess MMa and the inner wall surface of the molding recess MFa, so that the time from the injection of the polymer composition into the cavity CV to the shifting of the molding die into the second state is elongated and thereby the thickness of the cell film BF on the surface of the foam can be increased. The thickness of the cell film BF can also be adjusted by the temperature conditions (cooling conditions) of the female mold MF and the male mold MM. In order to bring the cells f formed inside the foam into a certain state at this time, it is preferable that the polymer composition be injected into the cavity CV under the conditions that the foaming agent comes into a supercritical state. The foaming agent for use at this time is preferably carbon dioxide, nitrogen, argon, or the like.

In this embodiment, forming relatively large cells inside the foam is advantageous in terms of allowing the foam to have transparency, as described above. In the conventional injection molding, when a polymer composition including a foaming agent and held in a heated and molten state is injected into a cavity, the pressure applied to the polymer composition is instantly and greatly reduced so that a large number of cells are generated in the polymer composition. Accordingly, the conventional injection molding tends to form a foam including a large number of fine cells. On the other hand, in forming a foam by the core-back method, the pressure reduction speed can be relatively freely adjusted by the configurations that a polymer composition including the foaming agent and held in a heated molten state is filled in the cavity CV in the first state, and thereafter the female mold MF and the male mold MM are moved away from each other to increase the volume of the cavity. That is, according to the core-back method, the pressure reduction speed for the polymer composition in the cavity can be moderated than that in the conventional injection molding. In other words, a ratio (Vp/Vm) of the pressure reduction speed (Vp) for the polymer composition to the mobile speed (Vm) of a gas (blowing agent) dispersed in the polymer composition is lower in the core-back method than in the conventional injection molding. Therefore, the core-back method can allow cells generated at the start of foaming to converge together and largely glow, whereas, the conventional injection molding is likely to continuously generate new cells due to the gas dispersed in the polymer composition during the process of causing the polymer composition to expand and to be filled in the cavity, which results in formation of a form with a large number of fine cells therein.

In order to form relatively large cells in the foam, adjusting the melt viscosity of the polymer composition during injection molding also serves an effective means. The melt viscosity of the polymer composition during injection molding is adjustable by the formulation of the polymer composition. The melt viscosity of the polymer composition during injection molding is also adjustable by the temperature conditions for injection molding.

In order to make it easy to form large cells as aforementioned in the foam, the core-back injection molding or the conventional injection molding is preferably performed under the temperature conditions in which a polymer included in the polymer composition has a specific complex viscosity. Specifically, a foam with less variation in cell size is easily obtained when the injection molding is performed in a state in which the polymer has a complex viscosity equal to or higher than a certain value. Therefore, the injection molding is preferably performed at a temperature at which the complex viscosity is 500 Pa·s or more, and is preferably performed at a temperature at which the complex viscosity is 600 Pa·s or more, when the complex viscosity of a polymer contained in the polymer composition in a largest amount is measured at a frequency of 10 Hz. The complex viscosity of the polymer at a frequency of 10 Hz and at a temperature during the injection molding is preferably 8000 Pa·s or less, more preferably 7500 Pa·s or less.

The injection molding is preferably performed at a temperature at which the complex viscosity is 700 Pa·s or less, and is preferably performed at a temperature at which the complex viscosity is 500 Pa·s or less, when the complex viscosity of the polymer is measured at a frequency of 600 Hz. The complex viscosity of the polymer at a frequency of 600 Hz and at a temperature during the injection molding is preferably 200 Pa·s or more, more preferably 300 Pa·s or more.

Therefore, in the injection step, the injection of the polymer composition is preferably performed under the temperature conditions in which a complex viscosity ($\eta_{10}$) of a polymer contained in the polymer composition in a largest amount (at a highest weight ratio) at a frequency of 10 Hz and a complex viscosity ($\eta_{600}$) of the polymer at a frequency of 600 Hz, satisfy both of formula (1) and formula (2) below.

$$500 \text{ Pa·s} \leq \eta^{10} \leq 8000 \text{ Pa·s} \quad (1)$$

$$200 \text{ Pa·s} \leq \eta_{600} \leq 700 \text{ Pa·s} \quad (2).$$

The complex viscosity can be measured based on JIS K 7244-6:1999 (ISO 6721-1:1994). Specifically, the complex viscosity can be measured using a dynamic viscoelasticity measuring instrument (product name "MCR-302" manufactured by Anton Paar GmbH). A measurement sample has a cone plate-shape having a diameter of 25 mm and a thickness of 0.105 mm, and measurement conditions can be as follows:

Measurement Conditions
  Measurement mode: Tensile mode of a sinusoidal strain
  Frequency: 10 Hz, 600 Hz
  Load: Automatic static load
  Dynamic strain: 5%
  Measurement temperature: Constant conditions in every measurement In the case where the polymer composition includes not only the polymer as a main component of the polymer composition but also a plurality of polymers, the injection molding is preferably performed under the temperature conditions, in which a mixed polymer having all the polymers each being mixed at a ratio of each of the polymers contained in the polymer composition, has a complex viscosity as aforementioned. The injection molding is preferably performed under the temperature conditions showing a complex viscosity as aforementioned when the complex viscosity of the polymer composition is measured in the state where the foaming agent is removed.

The temperature conditions showing a complex viscosity as aforementioned can be, for example, 155° C. to 165° C. when the base polymer is SEBS or polyolefin, and 205° C. to 215° C. when the base polymer is TPU or ester-based elastomer (TPEE).

The description of this embodiment is merely an example. This embodiment is described by taking, for example, the shoe provided with a plurality of midsoles including the first midsole and the second midsole layered in the vertical direction, but the midsole provided in the shoe sole of the present invention can be composed of one layer or three or more layers. Further, this embodiment is described by taking, for example, the shoe that has the cushioning member sandwiched between the first midsole and the second midsole, but the cushioning member can be provided between the midsole and the outsole or between the midsole and the upper portion. Moreover, the cushioning member can be arranged to be embedded in recesses formed in the midsole. This embodiment is described by taking, for example, the case where two cushioning members are used, but the number of the cushioning member is not particularly limited to two and can be one, or three or more. This embodiment is described by taking, for example, the form in which two foams composed of the same polymer composition are respectively used as the first cushioning member and the second cushioning member, but, in the case of using a plurality of cushioning members, the cushioning members can be composed of different polymer compositions constituting the cushioning members. Also, a plurality of polymer compositions can be used in forming one cushioning member. That is, the shoe sole member of the present invention can have one portion and another portion respectively composed of different polymer compositions. This embodiment is described by taking, for example, the case where the shoe sole member of the present invention is used as a cushioning member, but the intended use of the shoe sole member of the present invention is not limited to the cushioning member. This embodiment is described by taking, for example, the case where the shoe sole member of the present invention is exposed to the lateral side of the shoe for use, but the shoe sole member of the present invention can be exposed to any side, for example, the medial side, the heel side (toward the rear side), or the ground engaging surface side. Further, the shoe sole member of the present invention can be used in the state of being entirely exposed in the outer periphery of the shoe sole like a midsole. That is, the shoe sole member of the present invention and the shoe of the present invention are not limited to the above embodiments.

EXAMPLES

Next, the present invention will be described in more detail with reference to test examples, but not limited thereto.

Example 1 to 3

Foams as the foams according to Examples 1 to 3 were prepared using a styrene-based elastomer or an ester-based elastomer (TPEE). In Examples 1 and 2, a raw material, which was obtained using a styrene-based elastomer (styrene-based block copolymer) as a main polymer and adding 10 to 30 parts by mass of paraffin oil as a plasticizer to 100 parts by mass of the polymer, was subjected to the core-back injection foam molding to prepare foams. At this time, the injection temperature of the raw material was set at 120° C. to have complex viscosities satisfying formula (1) and formula (2), respectively. The complex viscosities at 120° C. were as follows.

$\eta_{10}$: 7920 Pa·s Example 1, 657 Pa·s Example 2
$\eta_{600}$: 459 Pa·s Example 1, 222 Pa·s Example 2

In Example 3, a foam was prepared using a TPEE by the core-back injection foam molding in the same manner as above. At this time, the injection temperature of the raw material was set at 190° C. to have complex viscosities satisfying formula (1) and formula (2), respectively. The complex viscosities at 190° C. of the raw material of Example 3 were as follows.

$\eta_{10}$: 1250 Pa·s Example 3
$\eta_{600}$: 421 Pa·s Example 3

The density in a non-foamed state was 0.90 g/cm³ in Examples 1 and 2, and 1.12 g/cm³ in Example 3. Also, the total light transmittance in the non-foamed state was 79% in Example 1, 85% in Example 2, and 73% in Example 3.

Conventional Example

In the conventional example, the same raw material as in Example 2 and a common chemical foaming agent (ADCA) were used to prepare a foam.

For these foams, cell diameters (D10, D50, D90), apparent densities, total light transmittances, and elastic moduli (tensile elastic moduli) were measured. Table 1 below shows the results.

|  |  | Ex. 1 | Ex. 2 | Ex. 3 | Conventional Ex. |
|---|---|---|---|---|---|
| Main Component | | Styrene-based elastomer | Styrene-based elastomer | TPEE | Styrene-based elastomer |
| Average cell diameter (mm) | D50 | 0.83 | 2.8 | 2.0 | 0.23 |
|  | D10 | 0.61 | 2.2 | 0.9 | 0.11 |
|  | D90 | 1.4 | 4.3 | 4.5 | 0.45 |
| Apparent Density (g/cm³) | | 0.737 | 0.699 | 0.834 | 0.712 |
| Total light transmittance (%) | | 41% | 69% | 50% | 29% |
| Elastic modulus (MPa) | | 0.52 | 0.33 | 1.4 | 0.34 |

In the above case examples, the expansion ratios of all the foams were approximately the same ratios, namely 1.22 to 1.34 times, but, in Examples 1 to 3, cells had a large cell diameter and the forms had a high total light transmittance, namely 40% or more. On the other hand, in Conventional Example, fine cells were entrained, and the form had a low total light transmittance and fails to have transparency. As seen from the above, a shoe sole member being lightweight and excellent in cushioning properties while having transparency can be provided according to the present invention.

The invention claimed is:

1. A method for producing a shoe sole member constituted by a foam, comprising:
    injecting a polymer composition comprising a foaming agent in a heated and molten state into a cavity of a forming mold under temperature conditions in which a complex viscosity of a polymer contained in the polymer composition in a largest amount at a frequency of 10 Hz and a complex viscosity of the polymer at a frequency of 600 Hz satisfy both of formula (1) and formula (2) below:

$$500 \text{ Pa·s} \leq \eta^{10} \leq 8000 \text{ Pa·s} \quad (1)$$

$$200 \text{ Pa·s} \leq \eta 600 \leq 700 \text{ Pa·s} \ldots (2); \text{ and}$$

expanding a volume of the cavity with the injected polymer composition placed therein,
    the expanding the volume of the cavity comprising foaming the polymer composition to produce a foam by which the shoe sole member is constituted, and
    producing the foam so as to have transparency, an elastic modulus between 0.02 MPa and 1.4 MP of the foam, an expansion ratio between 1 time and 3 times of the foam, and an average cell diameter between 0.8 mm and 20 mm of the foam.

2. The method for producing a shoe sole member according to claim 1, wherein
    the polymer composition comprises one or more elements selected from the group consisting of an olefin-based polymer, a urethane-based polymer, an ester-based elastomer, and a styrene-based thermoplastic elastomer.

3. The method for producing a shoe sole member according to claim 2, wherein the polymer composition comprises a plasticizer.

4. The method for producing a shoe sole member according to claim 1, wherein the shoe sole is a midsole.

* * * * *